United States Patent
Geib et al.

(10) Patent No.: US 10,394,965 B2
(45) Date of Patent: Aug. 27, 2019

(54) CONCEPT RECOMMENDATION BASED ON MULTILINGUAL USER INTERACTION

(71) Applicant: SAP SE, Walldorf (DE)

(72) Inventors: Jochen Geib, Speyer (DE); Benjamin Schork, Wilhelmsfeld (DE); Christian Lieske, Malsch (DE); Matthias Becker, Weisenheim (DE); Thomas Jargstorff, Heilbronn (DE)

(73) Assignee: SAP SE, Walldorf (DE)

( * ) Notice: Subject to any disclaimer, the term of this patent is extended or adjusted under 35 U.S.C. 154(b) by 189 days.

(21) Appl. No.: 15/406,155

(22) Filed: Jan. 13, 2017

(65) Prior Publication Data

US 2018/0203849 A1    Jul. 19, 2018

(51) Int. Cl.
*G06F 17/28* (2006.01)
*G06F 17/27* (2006.01)

(52) U.S. Cl.
CPC ........ *G06F 17/289* (2013.01); *G06F 17/2785* (2013.01); *G06F 17/2854* (2013.01)

(58) Field of Classification Search
CPC . G06F 17/289; G06F 17/2854; G06F 17/2785
See application file for complete search history.

(56) References Cited

U.S. PATENT DOCUMENTS

| | | | |
|---|---|---|---|
| 6,219,632 B1* | 4/2001 | Schumacher | G06F 17/279 704/2 |
| 8,990,069 B1* | 3/2015 | Zens | G06F 17/2818 704/4 |
| 2009/0132232 A1* | 5/2009 | Trefler | G06Q 10/10 704/2 |
| 2014/0229155 A1* | 8/2014 | Leydon | G06Q 30/0217 704/2 |
| 2015/0095031 A1* | 4/2015 | Conkie | G10L 15/187 704/254 |
| 2017/0220562 A1* | 8/2017 | Yamauchi | G06F 17/2827 |

* cited by examiner

*Primary Examiner* — Angela A Armstrong
(74) *Attorney, Agent, or Firm* — Schwegman Lundberg & Woessner, P.A.

(57) ABSTRACT

Computer-assisted multilingual translations may utilize a concept database storing entries for a plurality of concepts, the entries including multilingual vectors of counterpart expressions for the respective concepts in a source language and multiple target languages. In various embodiments, for a given content item having an associated source-language expression, a set of concepts whose database entries match at least the source-language expression is identified, and target-language expressions for the identified concepts are used to iteratively update the set of concepts by identifying therein a subset of concepts that also match a user-selected one of the target-language expressions.

17 Claims, 8 Drawing Sheets

| Concept ID | English | German | Spanish | French | Italian | Portuguese |
|---|---|---|---|---|---|---|
| vid1 | order | Auftrag | pedido | ordre | ordine | ordem |
| vid2 | order | Reihenfolge | secuencia | séquence | sequenza | sequência |
| vid3 | order | bestellen | pedir | commander | ordinare | encomendar |
| vid4 | order | Order | orden | ordre | ordine | ordem |
| vid5 | order | Verordnung | prescripción | ordonnance | prescrizione medica | prescrição |
| vid6 | order | order | pedido | achat | ordine | ordem |

FIG. 2A

Example 1

| Concept ID | English | German | Spanish | French | Italian | Portuguese |
|---|---|---|---|---|---|---|
| vid1 | order | Auftrag | pedido | ordre | ordine | ordem |
| vid2 | order | Reihenfolge | secuencia | séquence | sequenza | sequência |
| vid3 | order | bestellen | pedir | commander | ordinare | encomendar |
| vid4 | order | Order | orden | ordre | ordine | ordem |
| vid5 | order | Verordnung | prescripción | ordonnance | prescrizione medica | prescrição |
| vid6 | order | order | pedido | achat | ordine | ordem |

Decision 1 → (German, vid2: Reihenfolge)

FIG. 2B

Example 2

| Concept ID | English | German | Spanish | French | Italian | Portuguese |
|---|---|---|---|---|---|---|
| vid1 | order | Auftrag | pedido | ordre | ordine | ordem |
| vid2 | order | Reihenfolge | secuencia | séquence | sequenza | sequência |
| vid3 | order | bestellen | pedir | commander | ordinare | encomendar |
| vid4 | order | Order | orden | ordre | ordine | ordem |
| vid5 | order | Verordnung | prescripción | ordonnance | prescrizione medica | prescrição |
| vid6 | order | order | pedido | achat | ordine | ordem |

Decision 1

FIG. 2C

Example 2 — continued

| Concept ID | English | German | Spanish | French | Italian | Portuguese |
|---|---|---|---|---|---|---|
| vid1 | Order | Auftrag | pedido | ordre | ordine | ordem |
| vid2 | Order | Reihenfolge | secuencia | séquence | sequenza | sequência |
| vid3 | Order | bestellen | pedir | commander | ordinare | encomendar |
| vid4 | Order | Order | orden | ordre | ordine | ordem |
| vid5 | Order | Verordnung | prescripción | ordonnance | prescrizione medica | prescrição |
| vid6 | Order | order | pedido | achat | ordine | ordem |

Decision 1 → Portuguese "ordem" (vid1, vid4)
Decision 2 → French "ordre" (vid1, vid4)

FIG. 2D

Example 2 — continued

| Concept ID | English | German | Spanish | French | Italian | Portuguese |
|---|---|---|---|---|---|---|
| vid1 | Order | Auftrag | pedido | ordre | ordine | ordem |
| vid2 | Order | Reihenfolge | secuencia | séquence | sequenza | sequência |
| vid3 | Order | bestellen | pedir | commander | ordinare | encomendar |
| vid4 | Order | Order | orden | ordre | ordine | ordem |
| vid5 | Order | Verordnung | prescripción | ordonnance | prescrizione medica | prescrição |
| vid6 | Order | order | pedido | achat | ordine | ordem |

Decision 1 → Portuguese "ordem" (vid1)
Decision 2 → French "ordre" (vid1)
Decision 3 → Spanish "pedido" (vid1)

FIG. 2E

CONCEPT RECOMMENDATION BASED ON MULTILINGUAL USER INTERACTION

FIELD

The present disclosure relates generally to computer-assisted multilingual translations. In particular, various embodiments pertain to a recommendation engine employed in translations from a source language into multiple target languages.

BACKGROUND

Software development often involves a so-called localization phase in which a software product is adapted to particular geographic target markets and their respective languages and cultures. For example, text elements in user interfaces, such as labels of menus, buttons, or other graphical control elements, the text in dialog boxes, or help files provided as a part of the software may be translated from a human language in which they were originally provided (herein also the "source language") into one or more other human languages (herein also "target languages"). Similarly, text in web forms (e.g., on a web site providing an electronic marketplace), electronic advertisements, and textual entries in a database maintained by an internationally operating company are often to be translated from a source language into one or more target languages.

The translation of electronic text, e.g., as occurring in the above examples, can be performed by a human, automatically by a translation program, or using a combination of auto-translation and human feedback. In one common translation process, for instance, a computer generates an initial translation, and a human translator thereafter reviews the computer translation and makes corrections, resolves ambiguities, etc. A human may, for example, use context and domain-specific knowledge to disambiguate a word in the source language that can have different meanings; an example of such a homonym is the English word "bank," which can refer to a financial institution, the rising ground bordering a body of water, or an arrangement of objects in a line or in tiers, and generally has different translations in the target language depending on the intended meaning.

BRIEF DESCRIPTION OF DRAWINGS

The present disclosure is illustrated by way of example and not limitation in the accompanying drawings.

FIGS. 2A-2E show a table with example entries of a concept database, illustrating the successive disambiguation of expressions for concepts in accordance with various embodiments.

DETAILED DESCRIPTION

Figure 1:
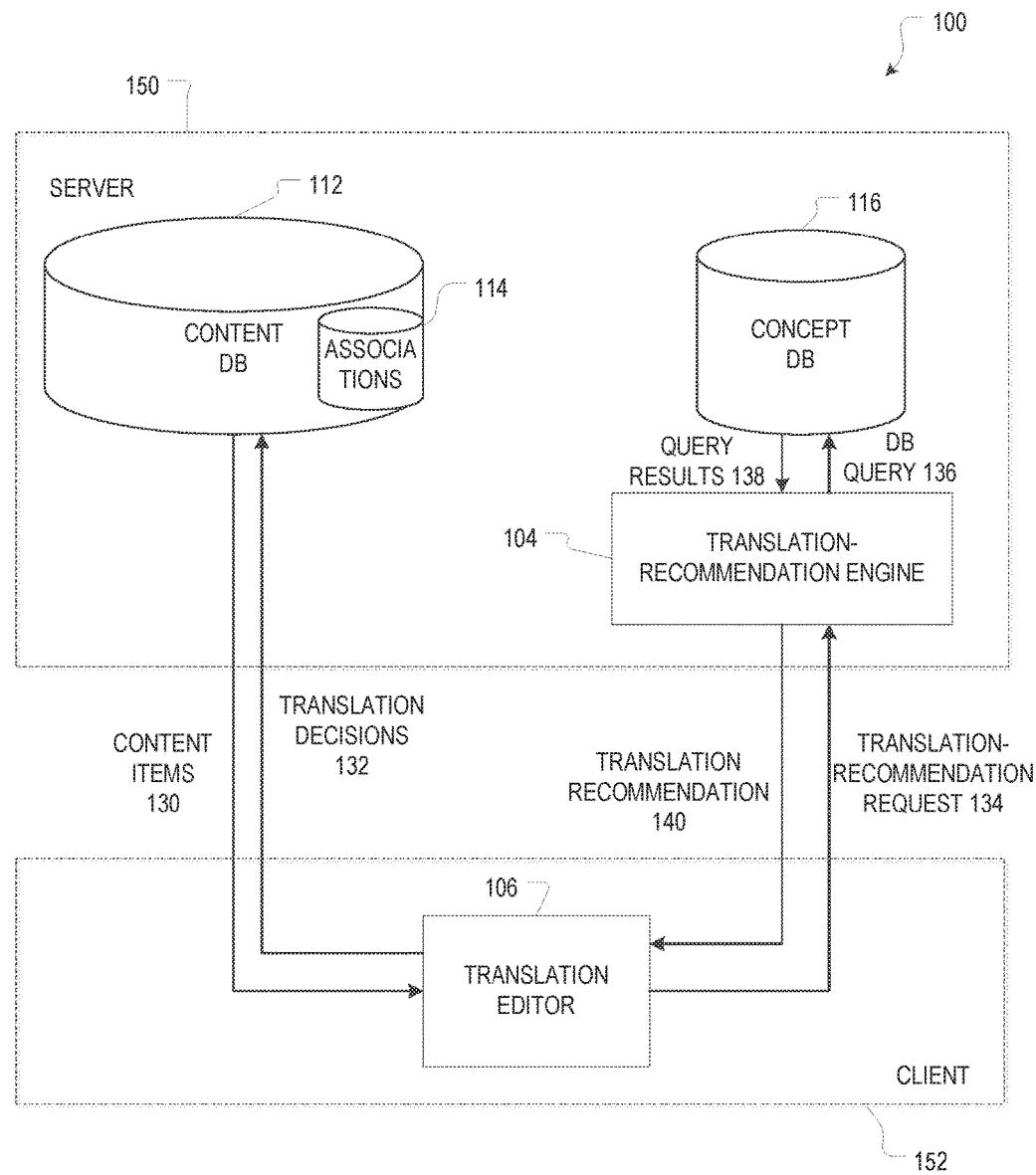
FIG. 1 is a block diagram of an example computing system facilitating multilingual translation in accordance with various embodiments

This disclosure relates generally to systems, methods, and computer-program products for the computer-assisted translation of electronic text into multiple human target languages. In contrast to the conventional bilingual approach, which involves isolated translation processes each between the source language and a single one of potentially multiple target languages, various embodiments described herein exploit human input provided during translation processes of source text into one or more target languages to inform one or more subsequent translations of the same source text into further target languages. In this manner, the cognitive effort made by a translator to, for example, disambiguate a term in the source language or correct an error in the source text inures to the benefit of other translators.

Various embodiments take advantage of the disambiguation potential that equivalent (or "counterpart") expressions for a given concept in multiple languages have when used in conjunction by utilizing a concept database whose entries each correspond to a distinct concept and include a multilingual vector with fields for text strings that express the concept in multiple respective languages. Optionally, the database entries may further include metadata that defines the context of the stored expressions, such as domain information (indicating a general subject area) or a type of text (e.g., caption, label, bullet list item, etc.). (The term "concept," as used herein, refers to a distinct meaning, as distinct from the word or phrase expressing the concept. The word or phrase may be ambiguous in meaning in that it can express multiple different concepts, depending on context. A given concept, understood to include the context in which it is used (where context may capture, e.g., domain and/or text type), usually maps onto a unique set of expressions in the multiple languages.) The concept database may be prepopulated, or may be populated progressively based on input received from human translators. For example, starting with a database entry including, apart from any metadata, only an expression for the concept in the source language, when a translator selects an expression for that concept in a first target language, that target-language expression may be written into the database entry. As the source expression is translated into further target languages, the database entry may be updated with corresponding target-language expressions in those additional languages.

A particular occurrence of a concept in a text (or, if applicable, in multiple counterparts of the text) is herein referred to as an "instance" of the concept (or "concept instance.") In accordance with various embodiments, the concept database can be used to translate a source expression for a concept instance into one or more target languages (or generating proposals or recommendations for such translations) by identifying concepts within the database that match the source expression (e.g., that contain the source expression of the concept instance as the expression in the source language). Once the concept is uniquely identified, it simultaneously provides translations into all target languages for which the respective database entry contains expressions (e.g., for a fully populated concept database, all target languages included in the database). In practice, however, running a query including only the source language expression (and, optionally, any metadata) against the concept database will often result in multiple (sometimes a large number of) entries that match the source expression, but differ in expressions for one or more of the target languages. In accordance herewith, the initial set of concepts may be narrowed down iteratively based on human translation decisions. That is, once a user has selected, among a list of generally multiple concepts matching the source expression for the given concept instance, an expression in one target languages, subsequent queries to the database may specify a set of counterpart expressions in the source language and the previously selected target languages to identify database entries that match both expressions (and, optionally, metadata). To the extent the identified database entries include one or more expressions in a second target language, these one or more expressions can be returned as recommended translation choices into the second language, and the expression in the second language that the user selects can be included in the set of expressions against which the concept data is matched when queried for translations recommendations into a third target language, and so forth. Thus, the choices of translations of an ambiguous source expression into a certain target language can be narrowed down in many instances based on already made translations into one or more other target languages, used in conjunction with the concept database.

The foregoing will be more readily understood from the following detailed description of various example embodiments.

FIG. 1 is a block diagram of an example computing system 100 that facilitates multilingual translation using the approach described above, in accordance with various embodiments. The system 100 includes a translation-recommendation engine 104 and a translation editor 106, which may be implemented by one or more hardware processors executing suitable program code stored in memory. Further, the system 100 includes a concept database 110 and a content database 112, which may be stored in one or more computer-readable data storage devices. Some components and functionality of the system 100 are described in detail in U.S. Patent Application Publication No. 2016/0110346 by Lieske et al., entitled "Multilingual Content Production," which is hereby incorporated herein by reference.

The concept database 110 stores entries for a plurality of concepts. Each entry may include a unique concept identifier (ID), a multilingual vector containing textual expressions of the concept in multiple human languages, and (optionally) metadata associated with the concept, such as a domain of use or a type of text. An entry conceptually corresponds to a row in the database table, although it need not be stored in this manner. For example, expressions for a given concept in different languages may be stored in multiple respective rows, each along with the concept identifier and an identifier of the respective language. The concept database 110 may be built up gradually over time based on human-provided translations and identifications of concepts. Alternatively, the concept database 110 may be created automatically from bilingual dictionaries for the multiple languages (e.g., by identifying all possible combinations of mutually consistent expressions). Combinations of automatic and manual generation and population of the concept database 110 are also possible, and further methods may occur to those of ordinary skill in the art.

The content database 112 stores items of content that correspond to instances of concepts (even though it is generally not known at the outset which one of a particular concept a given content item instantiates), such as source expressions to be translated into multiple target languages, or language-agnostic artifacts for which multi-lingual content is to be provided. For example, in the context of software application development, the content database 112 may store data (including, e.g., program code) associated with the elements of a user interface, such as menus, software buttons or other user-interface controls, pop-up windows, and the like. These user-interface elements, in their functional aspects, constitute language-agnostic artifacts, whereas their associated texts (which include, e.g., labels, captions, titles, quick info text) are language-specific artifacts. The language-agnostic artifacts and electronic text accompanying them may be stored alongside each other in the same database or table, e.g., as various attributes of the user-interface elements. Alternatively, language-agnostic and language-specific artifacts may be stored separately, and associations therebetween may be recorded in yet another database or table. For example, in one embodiment, the content database 112 includes the language-agnostic artifacts as well as an associations table 114 that stores associations between the language-agnostic artifacts and concepts stored in the concept database 110; in this case, the multilingual vectors contained in the linked-to concept entries of the concept database 110 constitute the language-specific artifacts. Specifically, an entry in the associations table 114 may, for example, include an identifier of a language-agnostic artifact along with a concept identifier, and based on this information, language-specific artifacts for a given language-agnostic artifact can readily be retrieved with a simple look-up in the concept database 110. Concept associations with language-agnostic artifacts are described in more detail in U.S. Patent Application Publication No. 2016/0110346.

The translation editor 106 may implement a user interface that allows a user to retrieve items of content 130, such as language-agnostic artifacts and/or source expressions, from the content database 112, and to provide or select expressions for the retrieved items in one or more languages. For example, the translation editor 106 may be configured with a field presenting the source-language expression (herein also, more briefly, "source expression") and a text-entry field allowing the user to type in her translation. To assist with the translation, the translation editor 106 may retrieve and display, automatically or upon user request, translation proposals or recommendations for a specified target language, and the user can then select one of the proposed expressions. Whether typed in or selected from a list of translation proposals, the translation decisions 132 may be communicated to the content database 112 for storage thereat.

In some embodiments, a list of translation options is obtained from the concept database 110 via the translation-recommendation engine 104. Specifically, the translation editor 106 may send a translation-recommendation request 134 to the translation-recommendation engine 104, specifying, e.g., a source expression for the concept instance (or, if the user is in the process of creating the original source-language content, a string entered by the user, which may be, e.g., a portion of an expression) and the desired target language. To the extent the source expression has previously been translated into other languages, these other expressions of the concept instance may likewise be included in the translation-recommendation request 134 for the purpose of disambiguation. (As explained further below, the source expression and other available expressions for the concept instance may be provided directly as text strings, or specified indirectly through an identifier of a concept assigned to the concept instance.) The translation editor 106 may also include drop-down menus facilitating user selection of a domain of usage, type of text, or other categories of metadata, and such metadata may likewise be included in the translation-recommendation request 134. Based on the translation-recommendation request 134, the translation-recommendation engine 104 may then construct a database query 136 to retrieve concepts that match the source expression and any other specified expressions and/or metadata. Consider, for example, the following structured-query-language (SQL) database query:

```
SELECT DISTINCT "VID", "TEXT_EN", "TEXT_DE", "...",
    "DOMAIN"
FROM "CONCEPTSDATABASE"
WHERE
    "DOMAIN_ID" = 123 AND
    "TEXT_ES" = pedido AND
    "TEXT_IT" = ordine
ORDER BY QUALITY DESC;
```

This query serves to retrieve all entries in the concept database 110 that belong to domain "123" and include the Spanish expression "pedido" and the Italian expression "ordine." (Of course, the above values of the domain and the Spanish and Italian expressions are merely examples used for illustrations, as is the selection of Spanish and Italian in the WHERE clause. In general, the WHERE clause include expressions in any language.)

In response to the database query 136, the concept database 110 returns, as query results 138, entries for all concepts that match the source-language expression as well as any specified metadata and/or counterpart expressions in other languages. The translation-recommendation engine 104 forwards the results 138, or information derived therefrom, as a translation recommendation 140 to the translation editor 106, where it may be displayed to the user. The translation recommendation 140 may, for example, include a list of matching concepts and/or the associated multilingual vector, which generally includes expressions of the concept in multiple languages. Alternatively, the translation-recommendation engine 104 may extract expressions in the target language (as specified in the translation-recommendation request 134) from the query results 138, and forward only those expressions to the translation editor 106. Optionally, the translation-recommendation engine 104 may process the query results 138 to generate the translation recommendation 140. For example, the individual target-language expressions may be ranked or filtered based, at least in part, on the number of times they occur within the query results.

When selecting one of the proposed target-language expressions for a content item (corresponding to a concept instance) being reviewed in the translation editor 106, the user thereby implicitly selects one or more concepts for the content item. The assigned concepts generally constitute a subset of the set of concepts retrieved from the concept database 110 in response to the translation-recommendation request 134: if the target-language expression is selected from among multiple different expressions, the user's selection of one of them narrows down the set of concepts. (In cases where the user has only one target-language expression to choose from, the subset is coextensive with the retrieved set of concepts.) The user's translation decision 132 can be submitted to and stored in the content database 112 in various forms. For example, the selected target-language expression itself may be stored in the content database 112 in association with the content item. During subsequent translations into further languages, the previously stored target-language expressions can be retrieved and included, along with the source expression, in the translation-recommendation request 134. Alternatively, the translation decision 132 may take the form of a list of all concepts (e.g., identified by their concept IDs) within the subset of concepts that match the user-selected target-language expression. Subsequent translators can then use the stored list of concepts as a starting point to obtain proposals for expressions in a further target language, and, upon user selection of one of the proposed expressions, non-matching concepts can be deleted from the list. Yet another option is to store, as the translation decision 132, only one of potentially multiple concepts (identified by its concept ID), along with a list of the target languages for which the expressions contained in the associated multilingual vector have been validated (e.g., selected, or reviewed and accepted) by a human translator. In this case, when querying the concept database 110 later on to retrieve expressions in a further language, the previously validated counterpart expressions can be looked up in the concept database 110 based on the stored concept ID. A translation decision for the further language can result in the assignment of a different concept (and associated different multilingual vector) to the content item 130; the newly assignment concept will, however, be consistent with the previously validated target-language expressions. The concept assigned to the content item 130 will also change if a translator alters the original source-language expression, e.g., to correct an error therein. In this case, the updated concept generally also entails changes in the target-language expressions (regardless whether previously validated or not) that reflect the new source expression.

In storing texts and expression in multiple languages, the concept database 110 need not necessarily distinguish between source texts and translations, but may store all counterparts of a given text on equal footing. In fact, the designations "source-language expression/source expression" and "target-language expression" are used herein generally with reference to a particular individual translation process, and may change between translation processes involving the same texts. For example, after a source text in a first language has been translated into a second language, the translated text in the second language may serve as the source text for the subsequent translation into a third language. Also, when the concept database is queried for entries matching a particular set of counterpart expressions in multiple languages, it is generally irrelevant which of the expressions was the initial source-language expression.

The various computational modules (e.g., translation-recommendation engine 104, translation editor 106) and data repositories (e.g., concept database 110, content database 112) of the computing system 100 may be implemented on a single machine or distributed across multiple machines that communicate with one another. For example, as shown (with dashed lines indicating the optional nature of the grouping), a server 150 (which may itself include multiple machines connected, e.g., via a local network) may centrally host the concept database 110, the content database 112, and translation-recommendation engine 104, and communicate, e.g., via a global network such as the Internet, with one or more clients 152 running the translation editor 106.

Furthermore, it will be appreciated by those of ordinary skill in the art that the functionality provided by the various system components described above may be organized in various alternative ways. For example, the translation-recommendation engine 104 may be integrated into the translation editor 106 as a sub-module thereof, such that the translation editor 106 directly accesses the concept database 110 to retrieve translation options in a target language.

FIGS. 2A-2E show a table with example entries of a concept database 110, illustrating the successive disambiguation of expressions for concepts in accordance with various embodiments. The table includes entries (represented as rows) for six concepts, each expressed in six different languages: English, German, Spanish, French, Italian, and Portuguese. (In the example, each individual row includes expressions for all six languages, but alternatively, expressions for different languages could be stored in separate rows, along with suitable language identifiers.) Each entry further includes a unique identifier ("Concept ID") that allows referencing the concept, e.g., in the associations table 114 of the content database 112. The concept database 110 may further include one or more columns for storing metadata associated with the concepts.

The six entries shown in FIG. 2A are examples of query results 138 returned by the concept database 110 in response to a search for concepts for the English expression "order" (which is, for purposes of this example, the source language). The term "order" is ambiguous in that it may refer, for instance, to a sequence or, alternatively, a purchase order; accordingly, multiple translation options exist for each of the other five languages (which are, for purposes of this example, the target languages). Human translators can generally resolve the ambiguity based on context to decide which one of the possible translations is most suitable. While the translation decisions can be made separately and independently from one another for various target languages, various embodiments use them interdependently such that a translation decision made by one translator inures to the benefit of another. FIG. 2B illustrates this point with the example of a translation decision made during the translation of the English term "order" to German. As shown, if the translator selects, for example, the German expression "Reihenfolge," the proper translations into Spanish, French, Italian, and Portuguese are thereby fixed as well. In this example, a single translation decision, thus, reduces the number of translation options to only one for each target language, that is, it fully resolves the ambiguity (or, in other words, uniquely identifies one matching concept).

FIGS. 2C-2E provide a second example, illustrating the step-wise disambiguation in multiple successive translation decisions. Here, as shown in FIG. 2C, the first decision is made during the translation from English to Portuguese. Selection of the Portuguese expression "ordem" implicitly also selects the Italian counterpart "ordine," but leaves multiple possibilities open for French, Spanish, and German. If next, as shown in FIG. 2D, the French expression "ordre" is selected (rather than the alternative "achat" left open by the first decision), the translation options for Spanish and German are each reduced from three to two. Finally, as shown in FIG. 2E, selection of one of the remaining two choices in Spanish also fixes the expression in German, and vice versa. As can be seen, in this second example, three translation decisions determine the expressions to be used in five target languages. In general, in various embodiments, the number of expressions determined by a single, unique concept may exceed the number of user translations decisions needed to home in on that concept.

Figure 3:
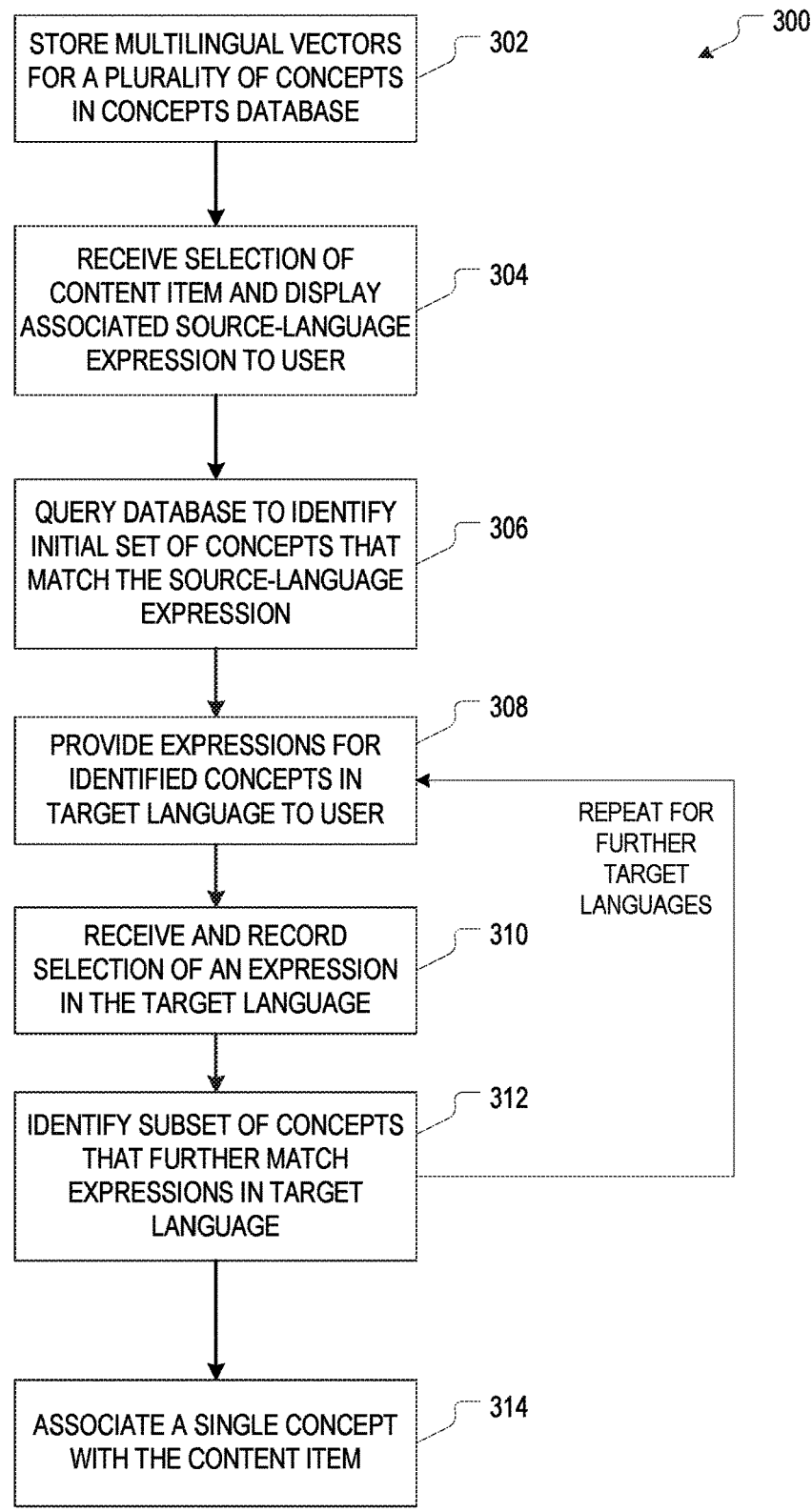
FIG. 3 is a flow chart of an example method for multilingual translation in accordance with various embodiments.

FIG. 3 is a flow chart of an example method 300 for multilingual translation in accordance with various embodiments. In overview, the method 300 involves storing multilingual vectors for a plurality of concepts in a concept database 110 (operation 302), and obtaining, for a content item having an associated source-language expression, counterpart expressions in multiple target language while, in the course of doing so, iteratively narrowing down a set of concepts that match the source-language and target-language expressions. The translation process begins with the selection of a content item (such as, e.g., a user-interface element or similar language-agnostic artifact) by a user, and the display of an associated source-language expression to the user, e.g., in a translation editor 106 (operation 304).

To determine possible translations of the source-language expression, the concept database is queried, e.g., in response to a translation-recommendation request 134 initiated by the user, to identify an initial set of concepts that match the source-language expression (and, optionally, metadata associated with the content item) (operation 306). Expressions for the identified concepts in the target language are then provided as a translation recommendation to the user, e.g., by displaying them in the translation editor (operation 308). Upon receipt, from the user, of a selection of an expression in the target language that suitably translates the source-language expression, the target-language expression, or some other indicator of the user's selection (e.g., concept IDs for one or more entries of the concept database that contain the selected target-language expression), is recorded, e.g., in the content database 112 (operation 310). The recorded target-language expression along with the source-language expression may be used to identify a subset of the initial set of concepts that contains only concepts matching both expressions (operation 312). The process of providing expressions for the identified concepts in a selected target language (operation 308), receiving and recording a user selection of one of the target-language expressions (operation 310), and updating the set of concepts to include only concepts that match the selected target-language expression (operation 312) may then be repeated iteratively for further target languages to decrease the number of matching concepts. In some embodiments, the iterations continue until a single concept is associated with the content item (act 314); homing in on this single concept may take fewer iterations and translation decisions than there are languages in the multilingual vector. In some embodiments, the set of concepts can be updated, at any point in the process, based on a correction received for the source-language expression.

In one aspect, a system in accordance with various embodiments includes a database storing entries for a plurality of concepts, each entry comprising a multilingual vector of counterpart expressions for the respective concept in a source language and multiple target languages. The system further includes one or more hardware processors configured to perform operations comprising identifying, for a content item (e.g., in some embodiments, a language-agnostic artifact) having an associated source expression in the source language, a set of concepts whose database entries match at least the source expression (and, optionally, the metadata associated with the content item), and iteratively updating the set of concepts. Updating the set of concepts involves providing, for one of the target languages, target-language expressions for the concepts within the set as a translation recommendation to a user, and receiving, from the user, a translation decision selecting one of the target-language expressions, and identifying, within the set of concepts, a subset of concepts whose database entries further match the selected target-language expression. In some embodiments, the entries in the database further include metadata associated with the concepts, and the identified concepts are further to match metadata associated with the content item. In some embodiments, for each iteration, the translation recommendation is provided in response to a translation-recommendation request initiated by the user. The operations for identifying concepts may include constructing a database query that includes the source expression and any previously user-selected target-language expression.

In another aspect, a method in accordance with various embodiments involves storing entries for a plurality of concepts in a database, each entry comprising a multilingual vector of counterpart expressions for the respective concept in a source language and multiple target languages (and, optionally, further including metadata associated with the concept, such as domain information or a text type); and using one or more hardware processors to identify, for a content item (e.g., in some embodiments, a language-agnostic artifact) having an associated source expression in the source language (and, optionally, further having associated metadata), a set of concepts whose database entries match at least the source expression (and, optionally, the metadata associated with the content item), and to iteratively update the set of concepts (by providing in each iteration, for one of the target languages, target-language expressions for the concepts within the set as a translation recommendation to a user; receiving, from the user, a translation decision selecting one of the target-language expressions; and identifying, within the set of concepts, a subset of concepts whose database entries further match the selected target-language expression). The set of concepts may be iteratively updated until it includes only a single concept, and the database entry associated with the single concept may include expressions in a number of target languages that exceeds the number of user translation decisions received during the iterative updates. In some embodiments, the method further includes, in response to receipt of a corrected source expression, generating an updated set of concepts whose entries match the corrected source expression. The translation recommendation(s) may each be provided in response to a translation-recommendation request initiated by the user. The concepts may be identified using a database query that includes the source expression and any previously user-selected target-language expressions.

In yet another aspect, one or more tangible machine-readable media store a database containing entries for a plurality of concepts, each entry comprising counterpart expressions for the respective concept in a source language and multiple target languages (and, optionally, further including metadata associated with the concept, such as domain information or a text type); and instructions to control the operation of one or more hardware processors. The instructions, when executed by the one or more hardware processors, cause the one or more hardware processors to perform operations comprising identifying, for a content item (e.g., in some embodiments, a language-agnostic artifact) having an associated source expression in the source language (and, optionally, further having associated metadata), a set of concepts whose database entries match at least the source expression (and, optionally, the metadata associated with the content item), and to iteratively update the set of concepts (by providing, for one of the target languages, target-language expressions for the concepts within the set as a translation recommendation to a user, and receiving, from the user, a translation decision selecting one of the target-language expressions, and identifying, within the set of concepts, a subset of concepts whose database entries further match the selected target-language expression). In some embodiments, the iterative updates continue until the set of concepts until it includes only a single concept. The instructions may further cause the one or more processors to generate, upon receipt of a corrected source expression, an updated set of concepts whose entries match the corrected source expression. The operations for identifying concepts may include constructing a database query that includes the source expression and any previously user-selected target-language expression.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
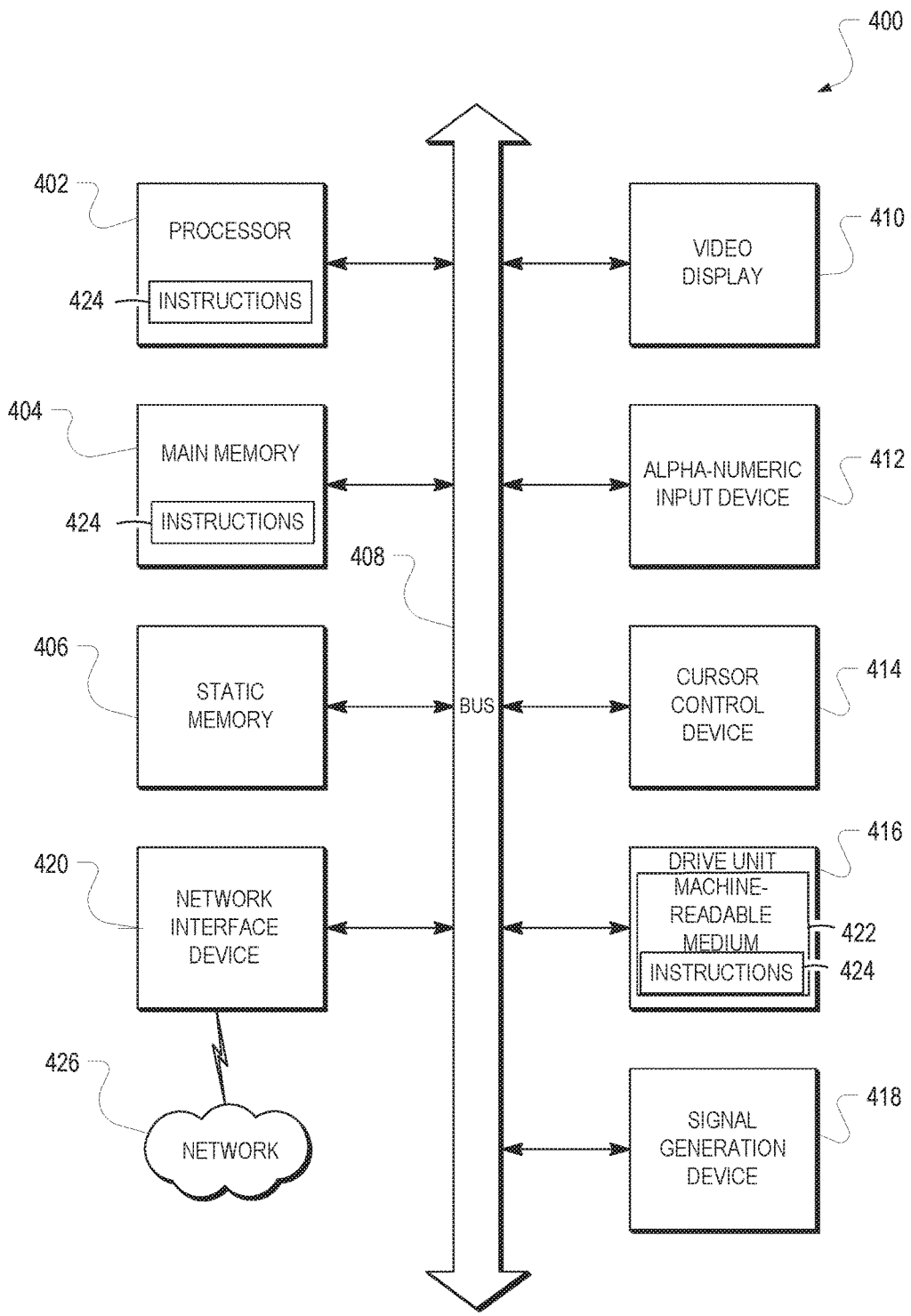
FIG. 4 is a block diagram of a computer processing system within which a set of instructions may be executed for causing a computer to perform any one or more of the methodologies discussed herein.

FIG. 4 is a block diagram of a computer processing system 400 within which a set of instructions 424 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 400 includes a processor 402 (e.g., a central processing unit (CPU), a graphics processing unit (GPU), or both), a main memory 404, and a static memory 406, which communicate with each other via a bus 408. The computer processing system 400 may further include a video display 410 (e.g., a plasma display, a liquid crystal display (LCD), or a cathode ray tube (CRT)). The computer processing system 400 also includes an alphanumeric input device 412 (e.g., a keyboard), a user interface (UI) navigation device 414 (e.g., a mouse and/or touch screen, or other cursor control device), a drive unit 416, a signal generation device 418 (e.g., a speaker), and a network interface device 420.

The drive unit 416 includes a machine-readable medium 422 on which is stored one or more sets of instructions 424 and data structures embodying or utilized by any one or more of the methodologies or functions described herein. The instructions 424 may also reside, completely or at least partially, within the main memory 404, the static memory 406, and/or within the processor 402 during execution thereof by the computer processing system 400, the main memory 404, the static memory 406, and the processor 402 also constituting tangible machine-readable media 422.

The instructions 424 may further be transmitted or received over a network 426 via the network interface device 420 utilizing any one of a number of well-known transfer protocols (e.g., Hypertext Transfer Protocol).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions 424. The term "machine-readable medium" shall also be taken to include any medium that is capable of storing, encoding, or carrying a set of instructions 424 for execution by the computer and that cause the computer to perform any one or more of the methodologies of the present application, or that is capable of storing, encoding, or carrying data structures utilized by or associated with such a set of instructions 424. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A system comprising:
 a database storing entries for a plurality of concepts, each entry comprising a multilingual vector of counterpart expressions for the respective concept in a source language and in multiple target languages; and
 one or more hardware processors configured to perform operations comprising:

receiving, via a network, a first request for translation recommendations, the first request including a source-language expression;

in response to the first request for translation recommendations, recommending a set of entries selected from the stored entries for the plurality of concepts based on the set of entries each including the source-language expression included in the first request for translation recommendations;

receiving, via the network, a first translation decision that specifies an entry among the recommended set of entries, the specified entry including a first target-language expression and the source-language expression, the specified entry identifying a subset of the recommended set of entries, each entry in the identified subset including the first target-language expression and the source-language expression;

receiving, via the network, a second request for translation recommendations, the second request including the source-language expression included in the first request for translation recommendations;

in response to the second request for translation recommendations, recommending the identified subset of entries that each include the first target-language expression and the source-language expression; and receiving a second translation decision that specifies an entry among the recommended subset of entries, the entry specified by the second translation decision including a second target-language expression, the first target-language expression, and the source-language expression, the entry specified by the second translation decision identifying a portion of the recommended subset of the set of entries, each entry in the identified portion including the first and second target-language expressions and the source-language expression.

2. The system of claim 1, wherein:

the recommending of the set of entries selected from the stored entries includes causing a user interface to display the recommended set of entries selected based on each entry in the set including the source-language expression; and the receiving of the first translation decision that specifies the entry among the recommended set of entries is in response to the specified entry being indicated via the user interface caused to display the recommended set of entries.

3. The system of claim 1, wherein the operations further comprise:

receiving a third request for translation recommendations, the third request including the source-language expression included in the first and second requests for translation recommendations; and in response to the third request for translation recommendations, recommending the identified portion of the subset of the set of entries, each entry in the identified portion including the first and second target-language expressions and the source-language expression.

4. The system of claim 3, wherein the operations further comprise:

receiving a third translation decision that specifies an entry among the recommended portion of the subset of the set of entries, the entry specified by the third translation decision including a third target-language expression, the first and second target-language expressions, and the source-language expression, the entry specified by the third translation decision identifying a part of the recommended portion of the subset of the set of entries, each entry in the identified part including the first, second, and third target-language expression and the source-language expression.

5. The system of claim 4, wherein the operations further comprise:

receiving a fourth request for translation recommendations, the fourth request including the source-language expression included in the first, second, and third requests for translation recommendations; and in response to the fourth request for translation recommendations, recommending the identified part of the portion of the subset of the set of entries, each entry in the identified part including the first, second, and third target-language expressions and the source-language expression.

6. A method comprising:

storing entries for a plurality of concepts in a database, each entry comprising a multilingual vector of counterpart expressions for the respective concept in a source language and in multiple target languages;

receiving, by one or more processors, a first request for translation recommendations, the first request including a source-language expression;

in response to the first request for translation recommendations and by the one or more processors, recommending a set of entries selected from the stored entries for the plurality of concepts based on the set of entries each including the source-language expression included in the first request for translation recommendations;

receiving, by the one or more processors, a first translation decision that specifies an entry among the recommended set of entries, the specified entry including a first target-language expression and the source-language expression, the specified entry identifying a subset of the recommended set of entries, each entry in the identified subset including the first target-language expression and the source-language expression;

receiving, by the one or more processors, a second request for translation recommendations, the second request including the source-language expression included in the first request for translation recommendations;

in response to the second request for translation recommendations and by the one or more processors, recommending the identified subset of entries that each include the first target-language expression and the source-language expression; and receiving a second translation decision that specifies an entry among the recommended subset of entries, the entry specified by the second translation decision including a second target-language expression, the first target-language expression, and the source-language expression, the entry specified by the second translation decision identifying a portion of the recommended subset of the set of entries, each entry in the identified portion including the first and second target-language expressions and the source-language expression.

7. The method of claim 6, wherein:

the recommending of the set of entries selected from the stored entries includes causing a user interface to display the recommended set of entries selected based on each entry in the set including the source-language expression.

8. The method of claim 7, wherein:

the receiving of the first translation decision that specifies the entry among the recommended set of entries is in response to the specified entry being indicated via the user interface caused to display the recommended set of entries.

9. The method of claim 6, further comprising:
receiving a third request for translation recommendations, the third request including the source-language expression included in the first and second requests for translation recommendations.

10. The method of claim 9, further comprising:
in response to the third request for translation recommendations, recommending the identified portion of the subset of the set of entries, each entry in the identified portion including the first and second target-language expressions and the source-language expression.

11. The method of claim 10, further comprising:
receiving a third translation decision that specifies an entry among the recommended portion of the subset of the set of entries, the entry specified by the third translation decision including a third target-language expression, the first and second target-language expressions, and the source-language expression, the entry specified by the third translation decision identifying a part of the recommended portion of the subset of the set of entries, each entry in the identified part including the first, second, and third target-language expression and the source-language expression.

12. The method of claim 11, further comprising:
receiving a fourth request for translation recommendations, the fourth request including the source-language expression included in the first, second, and third requests for translation recommendations.

13. The method of claim 12, further comprising:
in response to the fourth request for translation recommendations, recommending the identified part of the portion of the subset of the set of entries, each entry in the identified part including the first, second, and third target-language expressions and the source-language expression.

14. One or more tangible non-transitory machine-readable media storing:
a database containing entries for a plurality of concepts, each entry comprising a multilingual vector of counterpart expressions for the respective concept in a source language and in multiple target languages; and
instructions to control operation of one or more hardware processors, the instructions, when executed by the one or more hardware processors, causing the one or more hardware processors to perform operations comprising:
receiving, via a network, a first request for translation recommendations, the first request including a source-language expression;
in response to the first request for translation recommendations, recommending a set of entries selected from the stored entries for the plurality of concepts based on the set of entries each including the source-language expression included in the first request for translation recommendations;
receiving, via the network, a first translation decision that specifies an entry among the recommended set of entries, the specified entry including a first target-language expression and the source-language expression, the specified entry identifying a subset of the recommended set of entries, each entry in the identified subset including the first target-language expression and the source-language expression;
receiving, via the network, a second request for translation recommendations, the second request including the source-language expression included in the first request for translation recommendations;
in response to the second request for translation recommendations, recommending the identified subset of entries that each include the first target-language expression and the source-language expression; and
receiving a second translation decision that specifies an entry among the recommended subset of entries, the entry specified by the second translation decision including a second target-language expression, the first target-language expression, and the source-language expression, the entry specified by the second translation decision identifying a portion of the recommended subset of the set of entries, each entry in the identified portion including the first and second target-language expressions and the source-language expression.

15. The one or more machine-readable media of claim 14, wherein the operations further comprise:
receiving a third request for translation recommendations, the third request including the source-language expression included in the first and second requests for translation recommendations, and
in response to the third request for translation recommendations, recommending the identified portion of the subset of the set of entries, each entry in the identified portion including the first and second target-language expressions and the source-language expression.

16. The one or more machine-readable media of claim 15, wherein the operations further comprise:
receiving a third translation decision that specifies an entry among the recommended portion of the subset of the set of entries, the entry specified by the third translation decision including a third target-language expression, the first and second target-language expressions, and the source-language expression, the entry specified by the third translation decision identifying a part of the recommended portion of the subset of the set of entries, each entry in the identified part including the first, second, and third target-language expression and the source-language expression.

17. The one or more machine-readable media of claim 16, wherein the operations further comprise:
receiving a fourth request for translation recommendations, the fourth request including the source-language expression included in the first, second, and third requests for translation recommendations; and
in response to the fourth request for translation recommendations, recommending the identified part of the portion of the subset of the set of entries, each entry in the identified part including the first, second, and third target-language expressions and the source-language expression.

\* \* \* \* \*